United States Patent [19]

Epperson et al.

[11] Patent Number: 5,752,204
[45] Date of Patent: May 12, 1998

[54] ANTENNA ASSEMBLY FOR RADIOTELEPHONIC DEVICE

[75] Inventors: Darrell Epperson, Wake Forest; Sandeep Chennakeshu; Peter Dimitrios Karabinis, both of Cary, all of N.C.

[73] Assignee: Telefonaktiebolaget L M Ericsson (publ)

[21] Appl. No.: 625,312

[22] Filed: Apr. 1, 1996

[51] Int. Cl.$^6$ ............... H04B 1/38; H04B 1/08
[52] U.S. Cl. ............... 455/575; 455/90; 455/347
[58] Field of Search ............... 455/12.1, 89, 73, 455/90, 129, 347, 575; 379/58, 59, 429, 433, 440; 343/700 MS, 702

[56] References Cited

U.S. PATENT DOCUMENTS

| | | | |
|---|---|---|---|
| 4,694,301 | 9/1987 | Wassum | 343/720 |
| 4,816,838 | 3/1989 | Mizuno et al. | 343/771 |
| 4,972,196 | 11/1990 | Mayes et al. | 343/700 |
| 4,973,972 | 11/1990 | Huang | 343/700 MS |
| 4,980,694 | 12/1990 | Hines | 343/702 |
| 4,992,799 | 2/1991 | Garay | 343/702 |
| 5,001,492 | 3/1991 | Shapiro et al. | 343/700 MS |
| 5,148,181 | 9/1992 | Yokoyama et al. | 343/702 |
| 5,164,985 | 11/1992 | Nysen et al. | 455/73 |
| 5,170,173 | 12/1992 | Krenz et al. | 343/702 |
| 5,231,407 | 7/1993 | McGirr et al. | 455/89 |
| 5,241,321 | 8/1993 | Tsao | 343/700 |
| 5,300,936 | 4/1994 | Izadian | 343/700 |
| 5,337,061 | 8/1994 | Pye et al. | 343/702 |
| 5,513,383 | 4/1996 | Tsao | 455/89 |
| 5,535,432 | 7/1996 | Dent | 455/12.1 |

*Primary Examiner*—Nguyen Vo
*Assistant Examiner*—Sam Bhattacharya
*Attorney, Agent, or Firm*—Jenkens & Gilchrist, P.C.; Robert H. Kelly

[57] ABSTRACT

An antenna assembly, and an associated method, facilitates communication of a radiotelephone operable in a satellite communication system, such as a satellite-cellular communication system. A patch antenna is rotatably coupled to a radiotelephonic housing of the radiotelephone. The patch antenna exhibits circular polarization characteristics, best to detect and to transmit communication signals to a satellite-based transceiver. By positioning patch antennas at opposing sides of the radiotelephone, down-link signals transmitted to the radiotelephone are detectable irrespective of the orientation of the radiotelephone.

13 Claims, 3 Drawing Sheets

ANTENNA ASSEMBLY FOR RADIOTELEPHONIC DEVICE

The present invention relates generally to antenna apparatus for a radio communication device, such as a radiotelephone operable, at least in one mode of operation, to communicate in a satellite communication system, such as a satellite-cellular communication system. More particularly, the present invention relates to an antenna assembly, and an associated methodology, for a radiotelephone operable at least in a satellite-based communication system in which communication signals are communicated between a satellite communication station and the radiotelephone.

Communication signals generated during operation of a satellite-based communication system are sometimes of low margin levels and low power levels. The antenna assembly, and its associated methodology, facilitate detection and transmission of such signals. The antenna assembly includes at least one patch antenna which exhibits circular polarization characteristics to facilitate detection of down-link signals transmitted to the radiotelephone and to facilitate transmission of up-link signals to the satellite-based communication station. The patch antenna is rotatably coupled to a radiotelephonic housing to permit positioning of the patch antenna to face upwardly towards the satellite-based communication station.

In one embodiment, two patch antennas, each exhibiting circular polarization characteristics are positioned at opposing sides of the radiotelephonic housing to facilitate better detection of down-link signals irrespective of the orientation of the radiotelephone.

The antenna assembly is further advantageously utilized in a multi-mode radiotelephonic device operable both in a satellite-based communication system and in a terrestrial-based communication system. To facilitate communication in the terrestrial-based communication system, an antenna best suited to transduce communication signals therein, such as a monopole antenna, is additionally utilized.

BACKGROUND OF THE INVENTION

A communication system is formed, at a minimum, of a transmitter and a receiver interconnected by a communication channel. The communication system is operable at least to transmit communication signals, having an informational content, generated at, or applied to, the transmitter. The communication signals are transmitted to the receiver through the communication channel. The receiver is operable to receive the transmitted, communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission through the communication channel, and the receiver operable in the radio communication system permits reception of the communication signal transmitted through the communication channel.

Typically, the radio receiver includes tuning circuitry tunable to the frequencies of the communication channel through which the communication signal is transmitted, down-conversion circuitry for down-converting a receive signal formed of the communication signal from a transmission frequency into a lower frequency signal, demodulation, and decoder circuitry which permit the informational content of the communication signal to be recreated.

A radio communication system is advantageous for the reason that a fixed, or hard-wired, connection is not required to form the communication channel extending between the transmitter and receiver. Communication can be effectuated between remotely-positioned transmitters and receivers without the need to form the hard-wired or other fixed connections therebetween.

A cellular communication system is a type of radio communication system. When the infrastructure, hereinafter referred to as the network, of the cellular communication system is installed in a geographical area, a subscriber to the cellular system is generally able to communicate telephonically in the system when positioned at any location in the geographical area encompassed by the system.

Cellular communication networks have been installed throughout significant portions of at least many of the world's population centers. Large numbers of subscribers to cellular communication systems formed of such cellular networks are able to communicate telephonically when positioned in areas encompassed by such cellular networks.

However, in some areas, such as areas not proximate to population centers, conventional, i.e., terrestrial, cellular communication networks have not been installed. In areas of low population density, for instance, a terrestrial-cellular communication network might not be commercially viable and is not installed.

The terrestrial-cellular communication networks which have already been installed have also been constructed pursuant to various different standards. A radiotelephone operable in one of the cellular communication systems is sometimes not operable in others of the cellular communication systems.

Therefore, even in an area in which a cellular communication network has been installed, a user might not be able to communicate by way of the cellular communication network if the user attempts to utilize a radiotelephone constructed to be operable only with another one of the cellular communication networks.

Satellite-cellular communication systems have been proposed which, when implemented, shall permit a user, utilizing a radiotelephone operable therein, to communicate telephonically by way of the satellite-cellular communication system when positioned at almost any location. By transmitting down-link and signals between a satellite-based transceiver and the radiotelephone and up-link signals between the radiotelephone and the satellite-based transceiver, telephonic communication shall be possible between the radiotelephone and the satellite-based transceiver. By effectuating additional communication links between the satellite-based transceiver and a ground station, the user of the radiotelephone shall be able to communicate telephonically with another party by way of the ground station and the satellite-based transceiver.

Technical obstacles unique to a satellite communication system must be overcome in order to implement a workable, satellite-cellular communication system.

For instance, due to the significant distances necessarily separating a satellite-based transceiver and a terrestrial-based radiotelephone and also the inherent power limitations of both the satellite-based transceiver and the terrestrial-based radiotelephone, the communication signals transmitted therebetween are typically of relatively low power levels and, oftentimes, of fairly low signal to noise ratios.

Antennas forming portions of radiotelephones are used to transduce communication signals transmitted to the radiotelephone and to transduce communication signals generated by the radiotelephone. The ability of the antenna to ably transduce such communication signals is necessary, particularly when the communication signals might be of low power levels and signal to noise ratios.

Conventional, monopole antennas, or the like, conventionally utilized in terrestrial-based, radio communication systems, such as a terrestrial-cellular communication system, typically do not exhibit characteristics which facilitate detection of signals transmitted downwardly thereto by a communication station positioned at a significant altitude thereabove. Such antennas similarly do not facilitate transmission of up-link signals to the communication station positioned at the significant altitude thereabove.

While some radiotelephones proposed for use in a satellite-cellular communication system are also to include circuitry to permit their use in a terrestrial-cellular communication system, the conventional, monopole antennas used with the conventional, terrestrial-based radiotelephonic circuitry can not be reused to transduce communication signals communicated between the radiotelephone and a satellite-based transceiver.

What is needed, therefore, is an improved antenna device for a radiotelephonic device operable to communicate in a satellite-based communication system, such as a satellite-cellular communication system.

It is in light of this background information related to radio communication systems, such as a satellite-cellular communication system, that the significant improvements of the present invention have evolved.

SUMMARY OF THE INVENTION

The present invention advantageously provides an antenna assembly for a radiotelephonic device. The antenna assembly facilitates communication in a radio communication system, such as a satellite-cellular communication system in which a satellite-based communication station is positioned at a significant altitude above the radiotelephone.

The antenna assembly is of characteristics to facilitate the detection of low margin, low power communication signals communicated between the satellite communication station and the radiotelephone.

In one aspect of the present invention, the antenna assembly includes at least one patch antenna which exhibits circular polarization characteristics to facilitate detection of down-link signals transmitted to the radiotelephone and to facilitate transmission of up-link signals to the satellite-based communication station. The patch antenna is supported at an antenna support which is rotatably coupled to a radiotelephonic housing of the radiotelephone. Rotation of the patch antenna together with the antenna support permits positioning of the patch antenna to face upwardly towards the satellite-based communication station, best to receive down-link signals therefrom and best to transmit up-link signals thereto.

In another aspect of the present invention, the antenna assembly includes two patch antennas, each exhibiting circular polarization characteristics. The two patch antennas are each supported by antenna supports which are rotatably coupled to the radiotelephonic housing at opposing sides of the housing. By positioning the two patch antennas at the opposing sides of the housing, detection of down-link signals transmitted to the radiotelephone are facilitated irrespective of the orientation of the radiotelephone.

In yet another aspect of the present invention, the antenna assembly is coupled to a multi-mode radiotelephone operable both in a satellite-based communication system and a terrestrial-based communication system. A monopole antenna is coupled to circuitry of the radiotelephone operable in the terrestrial-based communication system, and the at least one patch antenna is coupled to the circuitry of the radiotelephone operable in the satellite-based communication system.

In these and other aspects, an improved antenna assembly for a radiotelephonic device having at least first radio receiver circuitry for receiving first down-link signals is disclosed. The first down-link signals are transmitted downwardly to the radiotelephonic device by a first network station positioned above the radiotelephonic device. At least portions of the first receiver circuitry are housed at a radiotelephonic housing. The antenna assembly at least detects the first down-link signals transmitted down to the radiotelephonic device. A first patch antenna is coupled to the first radio receiver circuitry. The first patch antenna exhibits circular polarization characteristics to facilitate reception of the first down-link signals when the first patch antenna is oriented in a position to face at least partially upwardly towards the first network station.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
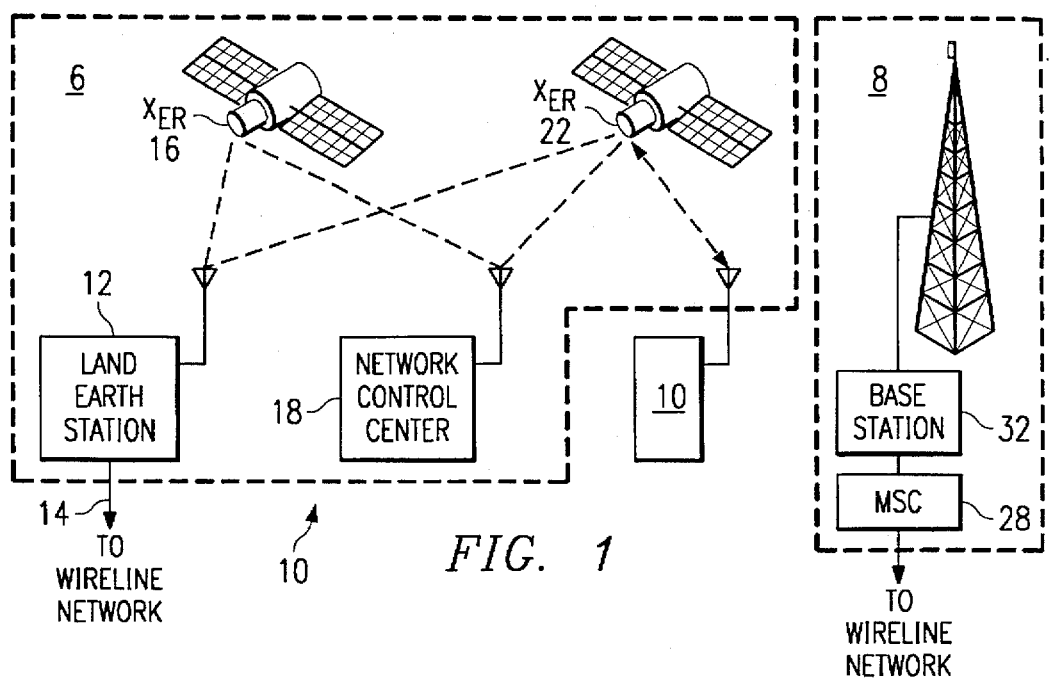
FIG. 1 illustrates a functional block diagram of a satellite-cellular communication system and a portion of a terrestrial-cellular communication system having a radiotelephone including an embodiment of the present invention.

Referring first to FIG. 1, portions of a satellite-cellular communication system 6 and portions of a terrestrial-cellular communication system 8 are shown. A dual-mode radiotelephone 10, here in functional block form, is also shown. The dual mode radiotelephone 10 includes an embodiment of the present invention and is operable to communicate in both of the communication systems 6 and 8.

The satellite-cellular communication system 6 includes a land Earth station 12 which is coupled, here represented by lines 14, to a wireline telephonic network. The land Earth station 12 includes transceiver circuitry for transceiving communication signals, inter alia, with a satellite-based transceiver 16.

The satellite-based transceiver 16 is operable to transceive communication signals not only with the land Earth station 12 but also with other land-based devices, such as transceiver circuitry of a network control center 18. The transceiver 16 is primarily operable as a relay to relay signals generated at the land Earth station 12 to the network control center 18 and vice-versa. The transceiver is preferably able to receive signals on any frequency channel and relay the signal on another frequency channel.

The transceiver circuitry of the network control center 18, in turn, is able to transceive communication signals with other satellite-based transceivers, such as the transceiver 22. The transceiver 22, similar to the transceiver 16, is able to transceive communication signals with land-based transceivers including, for example, the dual-mode radiotelephone 10. Analogous to the transceiver 16, the transceiver 22 is primarily operable as a relay to relay signals transmitted thereto. The transceiver circuitry of the illustrated devices each include a plurality of transceiving elements to permit concurrent communication between large numbers of communication stations.

Communication pursuant to a satellite-cellular communication system, such as the system 6 shown in FIG. 1, permits a user of the radiotelephone 10, to communicate telephonically when positioned at any location throughout large areas of the world. As long as the user of the radiotelephone 10 is positioned to permit transmission and reception of communication signals with a satellite-based transceiver, such as one of the transceivers 16 and 22, the user is able to communicate telephonically with a user of another telephonic device, such as a telephonic device of a conventional, wireline network. Because of the almost-worldwide scope permitted of a satellite-cellular communication system, the user of the radiotelephone 10 need not be concerned with the compatibility of the radiotelephone with a local, terrestrial-cellular system. The user is further capable of communicating telephonically in an area which does not otherwise have an installed cellular, or wireline, telephonic network.

For instance, when the land Earth station 12 (i.e., a telephone device coupled thereto) initiates a call to the radiotelephone 10, an indication of the initiation is provided to the network control center 18 by way of the transceiver 16. The network control center generates control signals, including paging signals, which are provided to the radiotelephone 10 by way of the transceiver 22. Once call set-up is successfully completed, voice channels between the land Earth station and the radiotelephone are defined to permit two-way communication between the land Earth station and the radiotelephone, by way of the transceiver 22.

As mentioned previously, power limitations limit the maximum power levels at which signals generated during operation of the satellite-communication system can be transmitted, and significant distances separate satellite-based transceivers and the radiotelephone. If communications pursuant to the terrestrial-cellular communication system 8 are also possible, a user of the radiotelephone 10 may elect to utilize the terrestrial-cellular communication system to communicate therethrough. Calls placed to the radiotelephone 10 may similarly be placed through the terrestrial-cellular communication system 8.

Accordingly, when communication between the radiotelephone 10 and the terrestrial-cellular communication system 8 is possible, communications can instead be effectuated between the radiotelephone 10 and the communication system 8. When, for example, a call is placed to the radio telephone 10 by way of the terrestrial-cellular communication system 8, the call is routed by way of a mobile switching center 28 and a base station 32, in conventional manner, to the radiotelephone 10. Calls originated by the radiotelephone 10 are analogously routed by way of the base station 32 and mobile switching center 28 to the wireline network, all in conventional fashion.

To communicate pursuant to either the satellite-cellular communication system 6 or the terrestrial-cellular communication system 8, the radiotelephone 10 must utilize antenna transducers to detect down-link signals transmitted thereto and to facilitate transmission of up-link signals generated at the radiotelephone 10. An assembly of an embodiment of the present invention facilitates communication of down-link and up-link signals transmitted between the radiotelephone 10 and the satellite-cellular communication system 6 and also between the radiotelephone 10 and the terrestrial-cellular system 8.

As mentioned above, because of power limitations limiting the power levels of both down-link and up-link signals communicated between the system 6 and the radiotelephone 10, and because of the significant distances separating the radiotelephone 10 and a satellite-based transceiver, down-link and up-link signals communicated between the system 6 and the radiotelephone 10 are generally of low power levels and low signal to noise ratios. The antenna of the radiotelephone used to transduce the down-link and up-link signals is, at least in part, determinative of the quality of communications that can be effectuated and, in some instances, can also be determinative of whether communications can be effectuated.

As also mentioned previously, a monopole, helical, or the like, antenna utilized to transduce communication signals between the radiotelephone 10 and the terrestrial-cellular communication system 8 is typically not of characteristics which facilitate detection of down-link signals or transmission of up-link signals communicated between the radiotelephone 10 and the satellite-cellular communication system 6 due to the relative altitudinal positioning of the satellite-based transceiver, such as the transceiver 22.

The assembly of an embodiment of the present invention provides an antenna which facilitates the communication of the down-link and up-link signals communicated between the satellite-cellular communication system and the radiotelephone 10. It should be noted, of course, that while the following description of the various embodiments of the present invention are described with respect to a satellite-cellular communication system, the present invention can similarly be embodied in other radio communication devices.

Figure 2:
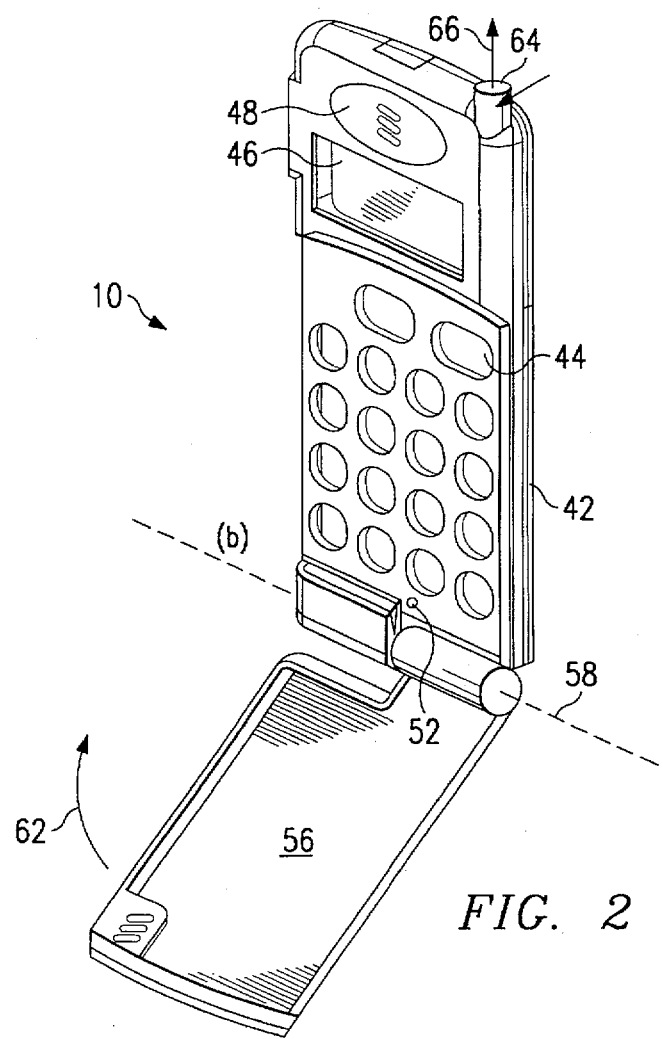
FIG. 2 illustrates a perspective view of a radiotelephone which includes an embodiment of the present invention as a portion thereof.

FIG. 2 illustrates the dual mode radiotelephone 10, operable to communicate pursuant to both of the satellite-cellular communication system 6 and the terrestrial-cellular communication system 8, shown in FIG. 1. The radiotelephone 10 includes a central housing body portion 42 which houses radio transceiver circuitry operable to communicate pursuant to the satellite-cellular communication system 6 and terrestrial-cellular communication system 8. The central housing body portion 42 further supports a telephonic keypad 44, a display element 46, a speaker 48, and a microphone 52.

The radiotelephone 10 is positioned by a user in conventional fashion to speak into the microphone 52 and to listen to audio signals generated by the speaker 48.

The radiotelephone 10 further includes a flip portion 56 rotatably coupled to the central housing body portion 42. In the embodiment illustrated in the figure, the flip portion 56 is hingedly connected to the central housing portion 42 at a microphone-end portion thereof to be rotatably coupled therewith about a rotation axis 58. Rotation of the flip portion 56 in a clockwise (as shown) direction, indicated by the arrow 62 positions the flip portion in a closed position in which the flip portion 56 substantially covers a keypad 44. When, conversely, positioned in the closed position, the flip portion 56 can be rotated in a counter-clockwise (as shown) direction opposite to the direction indicated by the arrow 62 to position the flip portion 56 in the illustrated, open position.

A monopole antenna is also supported at the central housing portion 42 of the radiotelephone. In conventional fashion, the monopole antenna is translatable along a longitudinal axis represented by the line 66 to be positioned at any position between the illustrated, retracted position and an extracted position, all in conventional fashion. The monopole antenna 64 is coupled to the transceiver circuitry operable pursuant to the terrestrial-cellular communication system 8, shown in FIG. 1. The length of the monopole antenna 64 is preferably dependent upon the frequencies at which communication signals are communicated between the terrestrial-cellular communication system 8 and the radiotelephone 10. For instance, in the United States, terrestrial-cellular communication systems are typically operable at frequencies of approximately 800 MHZ.

Figure 3:
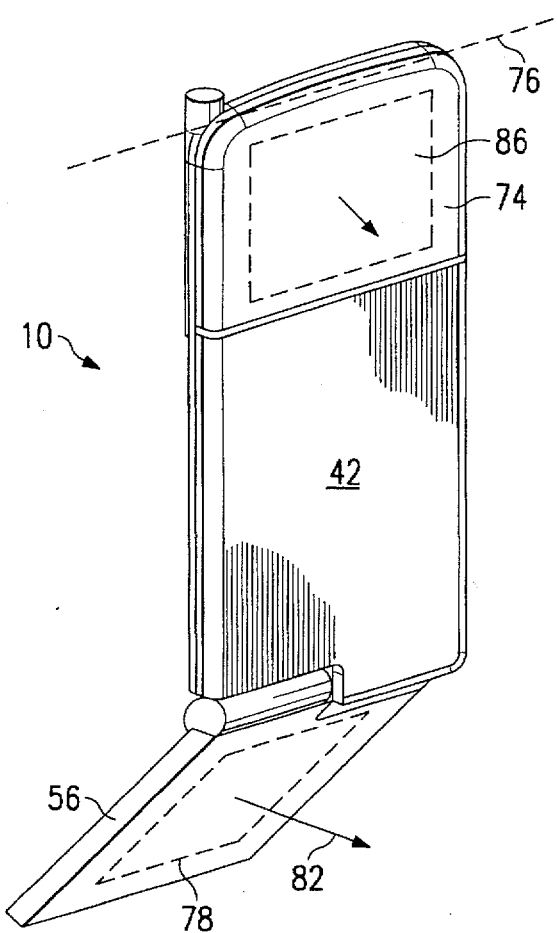
FIG. 3 illustrates another perspective view of the radiotelephone shown in FIG. 2, but taken from behind the radiotelephone.

The back side portion of the radiotelephone 10 is shown in FIG. 3. In this view, the radiotelephone 10 is further shown to include a back flip portion 74. The back flip portion 74 is rotatably coupled to the central housing portion 42 at a speaker-end portion thereof, here by way of a hinge assembly, to be rotatable about a rotation axis 76. As illustrated, the back flip portion 74 is positioned in a down position. By rotating the back flip portion 74 about the rotatable coupling with the central housing portion 42, the back flip portion is rotatable through a 180° arc to be positioned in an up position.

Both the flip portions 56 and 76 include patch antennas. A patch antenna 78 is supported at the flip portion 56 and exhibits a circular polarization. The patch antenna also exhibits a unidirectional radiation pattern, in the direction indicated by the line 82. The back flip portion 74 supports a patch antenna 86 which also exhibits a circular polarization. The patch antenna 86 also exhibits a unidirectional antenna pattern, in the direction indicated by the line 88. The patch antennas 78 and 86 are each coupled to the transceiver circuitry housed within the central housing portion 42 and operable pursuant to the satellite-cellular communication system 6. In one embodiment, the patch antenna 78 is coupled only to the receiver circuitry portion of such transceiver circuitry while the patch antenna 86 is coupled to both the receiver and transmitter circuitry portions of the transceiver circuitry.

The patch antennas 78 and 86 are supported at their respective flip portions 56 and 74 such that, when the flip portion 56 is in the closed position and the back flip portion 74 is in the down position, such as when the radiotelephone 10 is stowed, to facilitate detection of a paging signal transmitted to the radiotelephone 10 irrespective of the orientation of the radiotelephone.

When two-way communication is to be effectuated, the back flip portion 74 is rotated into a desired rotational position to facilitate best transmission and reception of communication signals during operation of the radiotelephone 10 by a user. In one embodiment, the back flip portion 74 is rotatable into several rotatable positions, such as at 30° incremental, rotational positions.

In one embodiment of the present invention, the patch antennas 78 and 86 also are of electrical characteristics to form narrowband filter circuits having pass bands corresponding to frequency bands located on frequency channels in which the satellite-cellular communication system is operable, such as at 1.6 GHz. The radiation fields of each the patch antennas 78 and 86 is right-hand, circular polarization and is uni-directional in nature. That is to say, the radiation field extends from only one side of the patch antenna. In one embodiment, the antenna gain of each of the patch antennas is greater than 0 dBi and each exhibit radiation patterns which, while broad, are not greater than 180° at −3 dB points.

Figure 4:
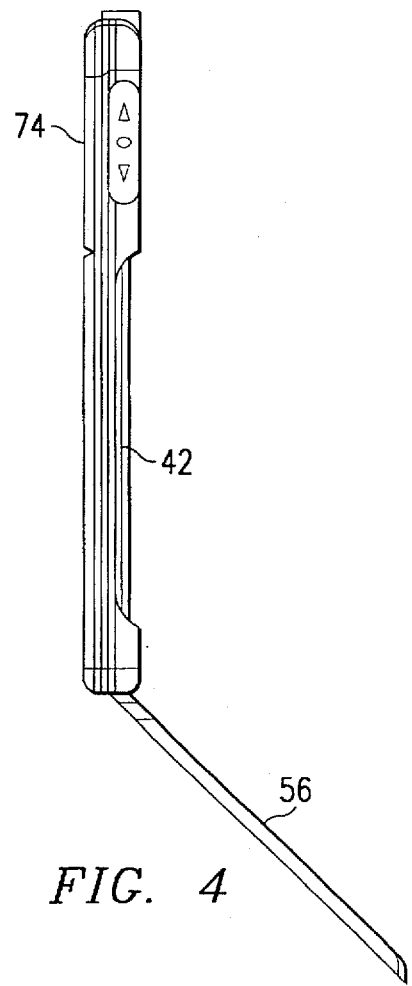
FIG. 4 illustrates a side, elevational view of the radiotelephone shown in FIGS. 2–3.

FIG. 4 illustrates again the radiotelephone 10 in which the flip portion 56 is in an open position and the back flip portion 74 is in the down position. The polarization fields 82 and 88 are again illustrated in FIG. 4.

Figure 5:
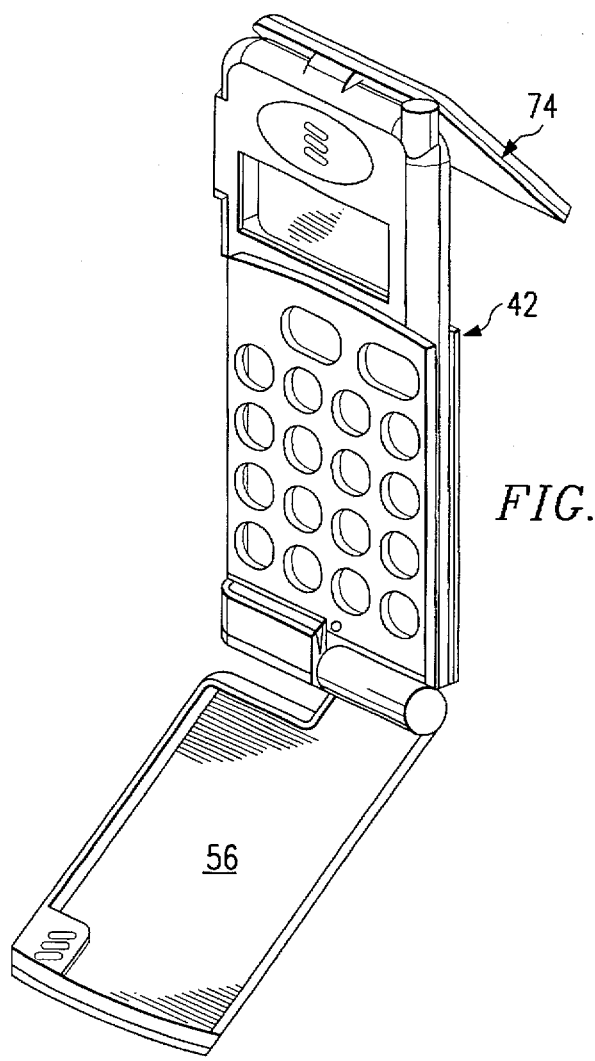
FIG. 5 illustrates another perspective view of the radiotelephone shown in FIGS. 2–4.

FIG. 5 illustrates the radiotelephone 10 in which the flip portion 56 is again in the open position and in which the back flip portion 74 is rotated partially out of the down position. As mentioned previously, the back flip portion 74 is rotated in a manner best to transceive communication signals during operation of the radiotelephone in conjunction with a satellite-cellular communication system.

Utilization of the patch antennas 78 and 86 rather than monopole antennas or quadrafillar helix, directional antennas is advantageous also for the reason that a smaller portion of their radiation patterns are intercepted by a user's head during the user's operation of the radiotelephone 10. As the patch antennas 78 and 86 can be supported within the bodies of the flip portions, the patch antennas are aesthetically more attractive than a quadrafillar helix antenna.

Figure 6:
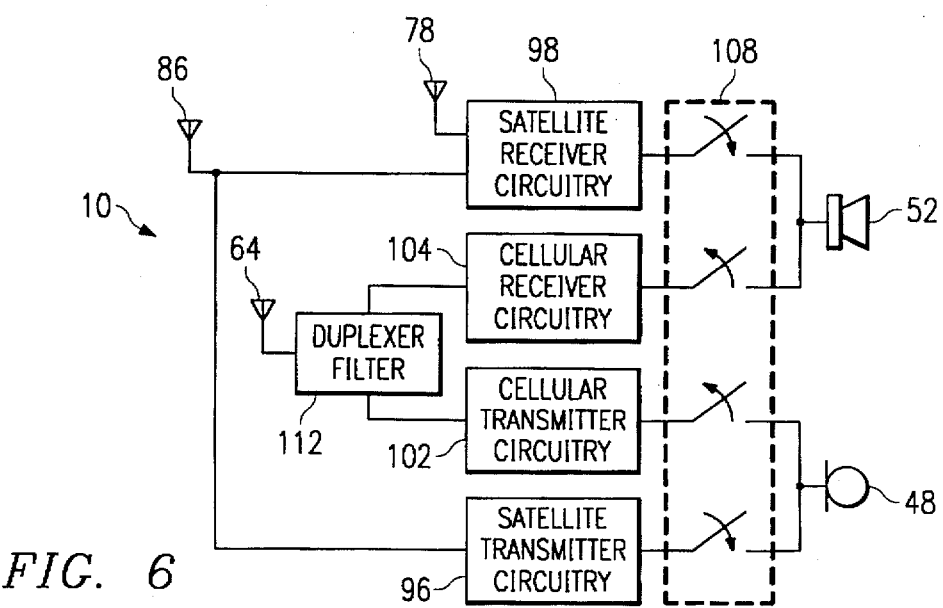
FIG. 6 illustrates a functional block diagram of the radiotelephone shown in FIGS. 2–5 of an embodiment of the present invention.

FIG. 6 illustrates the circuit connections of the circuitry of the radiotelephone 10. The radiotelephone 10 includes both transmitter and receiver circuitry 96 and 98, operable in a satellite-cellular communication system. Also, the radiotelephone 10 includes transmitter and receiver circuitry 102 and 104 operable in a terrestrial-cellular communication system. Either the transmitter and receiver circuitry 96 and 98 or the transmitter and receiver circuitry 102 and 104 is coupled to the speaker and microphone elements 52 and 48 of the radiotelephone, here by way of a switch element 108.

The circuitry 102 and 104 is coupled to a monopole antenna 64 by way of duplexer circuitry 112, in conventional manner. The transmitter and receiver circuitry 96 and 98 are both coupled to the patch antenna 86, and the receiver circuitry 98 is further coupled to the patch antenna 78.

The radiotelephone 10 including the antenna structure of an embodiment of the present invention advantageously facilitates detection and transmission of communication signals generated during operation of a satellite-cellular communication system and also during operation of a terrestrial-cellular communication system.

The previous descriptions are of preferred examples for implementing the invention, and the scope of the invention should not necessarily be limited by this description. The scope of the present invention is defined by the following claims.

What is claimed is:

1. In a radiotelephonic device having at least first radio receiver circuitry for receiving first down-link signals transmitted downwardly thereto by a first network station positioned above the radiotelephonic device and first radio transmitter circuitry for transmitting first up-link signals to the first network station, at least portions of the first radio receiver circuitry and of the first radio transmitter circuitry housed at a radiotelephonic housing having a front side and a back side, an improvement of an antenna assembly for detecting the first down-link signals transmitted down to the radiotelephonic device and for transmitting the first uplink signals therefrom, said antenna assembly comprising:

- a first antenna support having a rotatable coupling rotatably coupled to a top portion of the radiotelephonic housing at least alternately between a down position whereat said first antenna support is positioned to abut against the radiotelephonic housing and an up position whereat said first antenna support is positioned to extend above the radiotelephonic housing;
- a first patch antenna supported at said first antenna support and coupled to the first radio receiver circuitry, said first patch antenna exhibiting cellular polarization characteristics to facilitate reception of the first down-link signals when the first patch antenna is oriented in a position to face at least partially upwardly towards the first network station;
- a second antenna support having a rotatable coupling rotatably coupled to a bottom portion of the radiotelephonic housing at least alternately between a closed position whereat said second antenna support is positioned to abut against the radiotelephonic housing and an open position whereat said second antenna support is positioned to extend beneath the radiotelephonic housing; and
- a second patch antenna supported at said second antenna support and coupled to the first radio receiver circuitry, said second patch antenna exhibiting circular polarization characteristics to facilitate reception of the first down-link signals when the second patch antenna is oriented in a position to face at least partially towards the first network station.

2. The assembly of claim 1 wherein the radio receiver further comprises a speaker element supported at the radiotelephonic housing, thereby to define a speaker-end portion of the radiotelephonic housing, and wherein the rotatable coupling of said first antenna support is rotatably coupled to the speaker-end portion of the radiotelephonic housing.

3. The assembly of claim 1 wherein, when said antenna support is positioned in the down position, said antenna support positions said patch antenna to abut against the back side position of the radiotelephonic housing and, when said antenna is positioned in the up position said antenna support positions said patch antenna to extend above the radiotelephonic housing.

4. The assembly of claim 1 wherein said first patch antenna comprises a first patch portion tuned to a transmit band upon which the first up-link signals are transmitted and a second patch portion tuned to a receive band upon which down-link signals are transmitted.

5. The assembly of claim 1 wherein said first patch antenna further forms a narrowband filter at least for filtering the first up-link signals generated by said first radio transmitter circuitry.

6. The assembly of claim 1 wherein said narrowband filter formed of said first patch antenna further filters the first down-link signals transmitted by the first network station.

7. The assembly of claim 1 wherein the first network station comprises a satellite-based transceiver of a satellite-cellular communication system, and wherein said first patch antenna is coupled to the first radio receiver circuitry and to the first radio transmitter circuitry, and is of characteristics to transduce the first up-link signals and the first down-link signals transmitted during operation of the satellite-cellular communication system.

8. The assembly of claim 1 wherein the radiotelephonic device further comprises second radio receiver circuitry for receiving second down-link signals transmitted thereto by a second network station, at least portions of the second receiver circuitry housed at the radiotelephonic housing, and wherein said assembly further comprises a monopole antenna coupled to said second radio receiver circuitry, said monopole antenna for receiving the second down-link signals transmitted thereto by the second network station.

9. The assembly of claim 8 wherein the radiotelephonic device further comprises second radio transmitter circuitry for transmitting second up-link signals to the second network station and wherein said monopole antenna is further coupled to the second radio transmitter.

10. The assembly of claim 9 wherein the second network station comprises a base station of a terrestrial-cellular communication system, and wherein said monopole antenna is of characteristics to transduce the second up-link signals and the second down-link signals transmitted during operation of the terrestrial-cellular communication system.

11. The assembly of claim 8 wherein said monopole antenna comprises a rod antenna having longitudinally-expansible sections, said rod antenna positionable alternately in at least either a retracted position wherein substantial sectional portions of said rod antenna are positioned within the radiotelephonic housing and in an extracted position wherein the longitudinally-expansible sections thereof are expanded longitudinally to position substantial sectional portions of said rod antenna beyond the radiotelephonic housing.

12. The assembly of claim 1 wherein said second antenna support comprises a flip portion of the radiotelephonic device, said flip portion rotatably coupled to the radiotelephonic housing.

13. The apparatus of claim 1 wherein said first patch antenna is further coupled to the first radio transmitter circuitry and is further operable to facilitate transmission of the first uplink signals to the first network station.

* * * * *